(12) United States Patent
Engels et al.

(10) Patent No.: US 7,215,798 B2
(45) Date of Patent: May 8, 2007

(54) METHOD FOR FORGERY RECOGNITION IN FINGERPRINT RECOGNITION BY USING A TEXTURE CLASSIFICATION OF GRAY SCALE DIFFERENTIAL IMAGES

(75) Inventors: Angela Engels, Wolfratshausen (DE); Hanno Melzner, Höhenkirchen (DE); Peter Morguet, München (DE); Brigitte Wirtz, Holzkirchen (DE)

(73) Assignee: Infineon Technologies AG, München (DE)

( * ) Notice: Subject to any disclaimer, the term of this patent is extended or adjusted under 35 U.S.C. 154(b) by 670 days.

(21) Appl. No.: 10/713,692

(22) Filed: Nov. 14, 2003

(65) Prior Publication Data
US 2004/0125994 A1    Jul. 1, 2004

Related U.S. Application Data

(63) Continuation of application No. PCT/EP02/04616, filed on Apr. 25, 2002.

(30) Foreign Application Priority Data
May 14, 2001  (DE)  ................. 101 23 330

(51) Int. Cl.
*G06K 9/00* (2006.01)

(52) U.S. Cl. .................... 382/124; 340/5.83; 902/3

(58) Field of Classification Search ............. None
See application file for complete search history.

(56) References Cited

U.S. PATENT DOCUMENTS

| 4,827,527 | A | 5/1989 | Morita et al. |
| 5,953,331 | A | 9/1999 | Duncan et al. |
| 6,292,576 | B1 * | 9/2001 | Brownlee ................... 382/124 |
| 6,483,932 | B1 * | 11/2002 | Martinez et al. ........... 382/124 |
| 6,741,729 | B2 * | 5/2004 | Bjorn et al. ................ 382/124 |
| 2003/0035571 | A1 | 2/2003 | Haselsteiner et al. |

FOREIGN PATENT DOCUMENTS

| DE | 100 09 538 A1 | 9/2001 |
| DE | 100 09 539 A1 | 9/2001 |
| WO | 01/24700 A1 | 4/2001 |

* cited by examiner

*Primary Examiner*—Jingge Wu
*Assistant Examiner*—Charles Kim
(74) *Attorney, Agent, or Firm*—Laurence A. Greenberg; Werner H. Stemer; Ralph E. Locher

(57) ABSTRACT

In a method for forgery recognition in the fingerprint recognition, at first an image sequence is captured, which comprises a plurality of images of the fingerprint to be recognized. From at least two images capturing a texture captures a differential image. The texture will be compared with a predetermined texture in order to determine whether the captured image sequence comes from a real finger or from an imitation.

7 Claims, 6 Drawing Sheets

METHOD FOR FORGERY RECOGNITION IN FINGERPRINT RECOGNITION BY USING A TEXTURE CLASSIFICATION OF GRAY SCALE DIFFERENTIAL IMAGES

CROSS-REFERENCE TO RELATED APPLICATION

This application is a continuation of copending International Application No. PCT/EP02/04616, filed Apr. 25, 2002, which designated the United States and was not published in English.

BACKGROUND OF THE INVENTION

1. Field of the Invention

The present invention relates to a method for forgery recognition in fingerprint recognition by using a texture classification of gray scale differential images and particularly to a method for forgery recognition in fingerprint recognition based on a image sequence. In particular, the present invention relates to a dynamic software-based method for forgery recognition.

2. Description of Related Art

Fingerprint recognition is a reliable and widespread technique for personal identification. Several methods for the recognition of fingerprints are known in the related art, at first, the simple image recognition that capture an image of a finger being placed and compare it with stored images to identify a person.

The drawback of those methods is that they are very easy to deceive, for example by placing a silicone cast of a fingertip or something similar. Further, the large storage need for the comparison images ("templates") being used as well as the large computing effort are disadvantageous. The disadvantage of easy deceit also exists in minutien-based methods.

For the solution of these problems the related art has suggested to extract features from the fingerprints and to perform the recognition based on these features. Known biometric methods for personal recognition can for example be implemented in automated systems. Such systems process the input data comprising the biometric features and extract characteristic features that can then be associated with a person.

However, for a reliable personal association it has to be made sure that no manipulation is possible on the signal path between the object to be measured and the image capturing means.

In the recognition of fingerprints by an automatic system for fingerprint recognition methods are therefore necessary that only pass on images generated from real fingers to the processing means and eventually refuse images from imitations.

Approaches for solving these problems known in the related art will be discussed briefly below, wherein a distinction is made between hardware-based solutions and software-based solutions.

A first solution is to supplement the sensor by which the fingerprint is to be captured with integrated or external hardware components. Such known solutions capture, for example, an impedance of the placed fingers, as it is described in more detail in U.S. Pat. No. 5,953,331. Other technical realisations of hardware-based forgery recognition comprise moisture measurement, pulse measurement and pressure measurement.

Apart from the hardware-based solutions, solutions are known where the data for forgery recognition are evaluated via software. In the software-based forgery recognition there is made a distinction between static and dynamic methods.

In the static methods only one image is evaluated, usually the one that is also used for recognition. Static software-based forgery recognition method base for example on the evaluation of fingerprint images that exist as bitmap with gray scales. Other software-based static methods evaluate the sebaceous glands visible in the image.

In the dynamic methods a sequence of consecutive images of the sensor describing the process of placing the finger is used. A dynamic forgery recognition increases the recognition and forgery security of biometric fingerprint systems, where additionally, for example, a movement of the person, a pressure with which the finger is placed, or sweat on the finger are taken into account in the recognition. Other dynamic methods take the respective information for forgery recognition from sequences of finger print images.

The above-described dynamic software-based solution for forgery recognition, where respective information is extracted from sequences of finger print images for forgery recognition, is based on the large area deformation of the skin and therefore the fingerprint, which is known as "macro elasticity". The disadvantage of using the macro elasticity is that visible differences between original fingers and forgeries in general can only be recognised when the finger or the forgery are being placed with considerable pressure.

SUMMARY OF THE INVENTION

It is the object of the present invention to provide an improved method for forgery recognition where it can reliably be distinguished between a real fingerprint and a forged fingerprint without the fingerprint having to be generated under the consideration of certain marginal parameters, such as the contact pressure.

The present invention is a method for forgery recognition comprising the following steps:

(a) Capturing an image sequence comprising a plurality of images of the fingerprint to be recognised;

(b) Forming of at least one differential image from two images of the captured image sequence;

(c) Capturing a texture in the at least one differential image; and (d) Comparing the texture with a predetermined texture to determine whether the captured image sequence comes from a real finger or from an imitation.

The present invention is based on the knowledge that the movement characteristic visible in a image sequence while placing a finger is caused considerably by the elasticity of the finger, especially the skin. Here the two types of elasticity named below will be distinguished.

On the one hand the macro elasticity already mentioned above exists, that describes the large area deformation of the skin and therefore the fingerprint and that is accompanied by the disadvantages mentioned above. On the other hand is the "micro elasticity" describing the deformation of the finger lines in the simple placing of the finger, for example on a sensor unit.

Original finger and forged finger ("forgery") differ both in the micro and in the macro elasticity that are both visible in an image sequence of the placing procedure and are analysed by the inventive image-processing algorithm for forgery recognition. In capturing the macro elasticity, for example, a line growth of the finger lines can be captured.

Visible differences between original fingers and forgeries appear for macro elasticity only when finger or forgery are placed with considerable pressure. To avoid this disadvantage and to make sure that an image sequence is accomplished without participation of the person to be identified, namely only by simply placing the fingers, the present invention has found out that this can be accomplished by an analysis of the micro elasticity.

The micro elasticity is shown in the changes of the finger lines over time when they are placed. Here it can be seen that the fingerlings of the original finger become both broader and darker when it is placed, which is not the case to the same extent with the forged fingers.

The advantage of the present invention is based on the fact that examination of the micro elasticity makes it possible to distinguish between image sequences of original fingers and forgeries in a reliable way, since the micro elasticity is a significant feature that is hard to forge.

According to the present invention a texture classification of gray scale differential images of images of an image sequence consecutive in time is performed. Due to the classification result a forgery can be distinguished from an original.

BRIEF DESCRIPTION OF THE DRAWINGS

Preferred embodiments of the invention will be discussed in more detail below referring to the accompanying drawings in which.

DESCRIPTION OF THE PREFERRED EMBODIMENTS

Figure 1A:
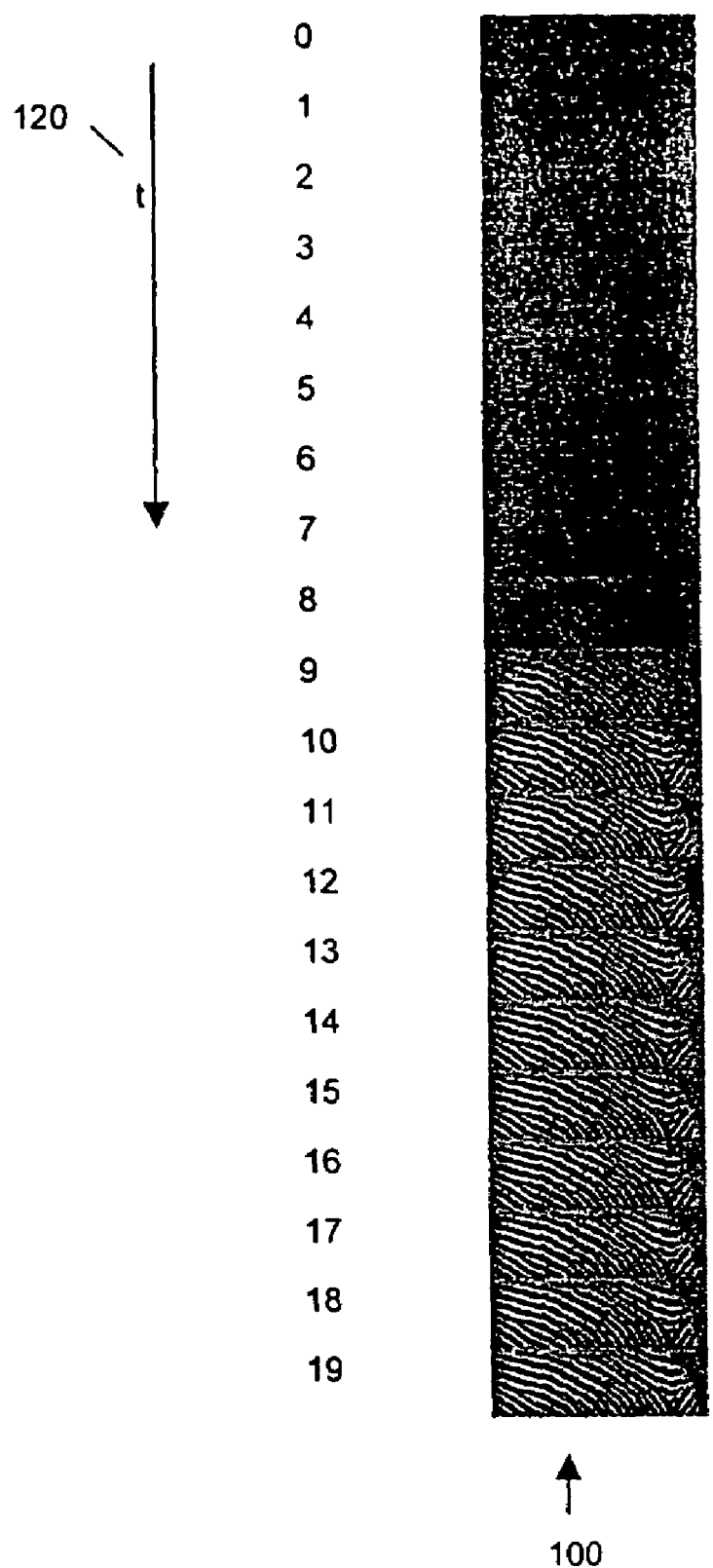
FIG. 1A is an image sequence that is the basis for the inventive method.
Figure 1B:
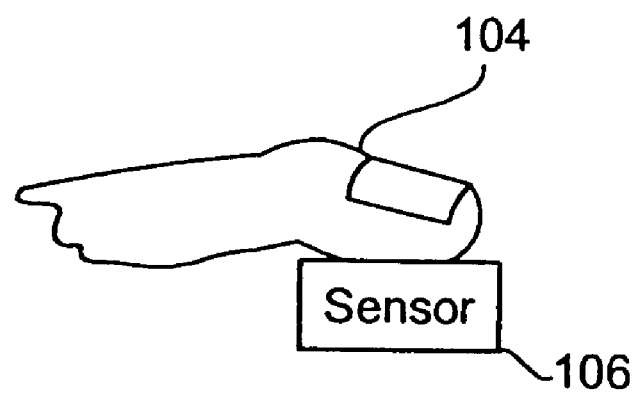
FIG. 1B is a schematic representation of the sensor unit.

In FIG. 1A in 100 an exemplary image sequence that is based on the inventive method for forgery recognition of fingerprints is shown. As can be seen, the image sequence 100 comprises a plurality of individual images 0 to 19, the individual images 0 to 19 being consecutive in time in the image sequence 100 as is illustrated by the arrow 102. Preferably, the image sequence 100 comprises individual images as bit maps with gray scales. The image sequence 100 is captured during the placing of finger 104, as shown in FIG. 1B, by a sensor unit 106. It should be noted that the image sequence 100 will not be captured during the placing of the finger on the sensor unit 106 but during the placing of the finger 104 on the sensor 106, as can be seen in the individual images 0 to 19. In detail, the images 0 to 6 show no finger at all and only from image 7 on it can be seen that the finger covers successively larger and larger areas of the image.

If the images of an image sequence come from a real finger, the contact area is getting larger across several images during the placing procedure. If the images of the image sequence come from a forgery, the fingerprint appears straight away with the full contact area without transition. Further, with real fingers, the contrast and the widths of the finger lines changes in the pictures after becoming visible. In a forgery both remain mostly unchanged in the images. The just mentioned effects result from the different elasticity of finger and forgery.

According to a preferred embodiment of the present invention, initially, from a sequence of gray scale images comprising the recognisable fingerprint, a sequence of differential images is calculated by subtracting two consecutive images of the sequence pixel by pixel. In the differential images different textures can be recognised at appropriate times in the image sequence, especially at the time of the first contact between finger 104 and sensor 106 (see FIG. 1B), depending whether the image sequence comes from an original finger or from a forgery. This reflects the different micro elasticity of finger and forgery materials. According to a texture classification of the gray scale differential images it will be determined whether the sequence comes from an original finger or from a forgery.

According to FIG. 2 a first preferred embodiment of the present invention will be discussed in more detail below. From the captured image sequence there will always be generated a different image sequence. From this differential image sequence a particularly characteristic differential image has to be selected. For that, at first gradient images and subsequently the histograms of the gradient images will be calculated in ascending sequence of the differential image sequence. The center of gravity of the histograms will be determined. If this center passes a threshold, the respective histogram will be used for the subsequent forgery recognition.

Figure 2A:
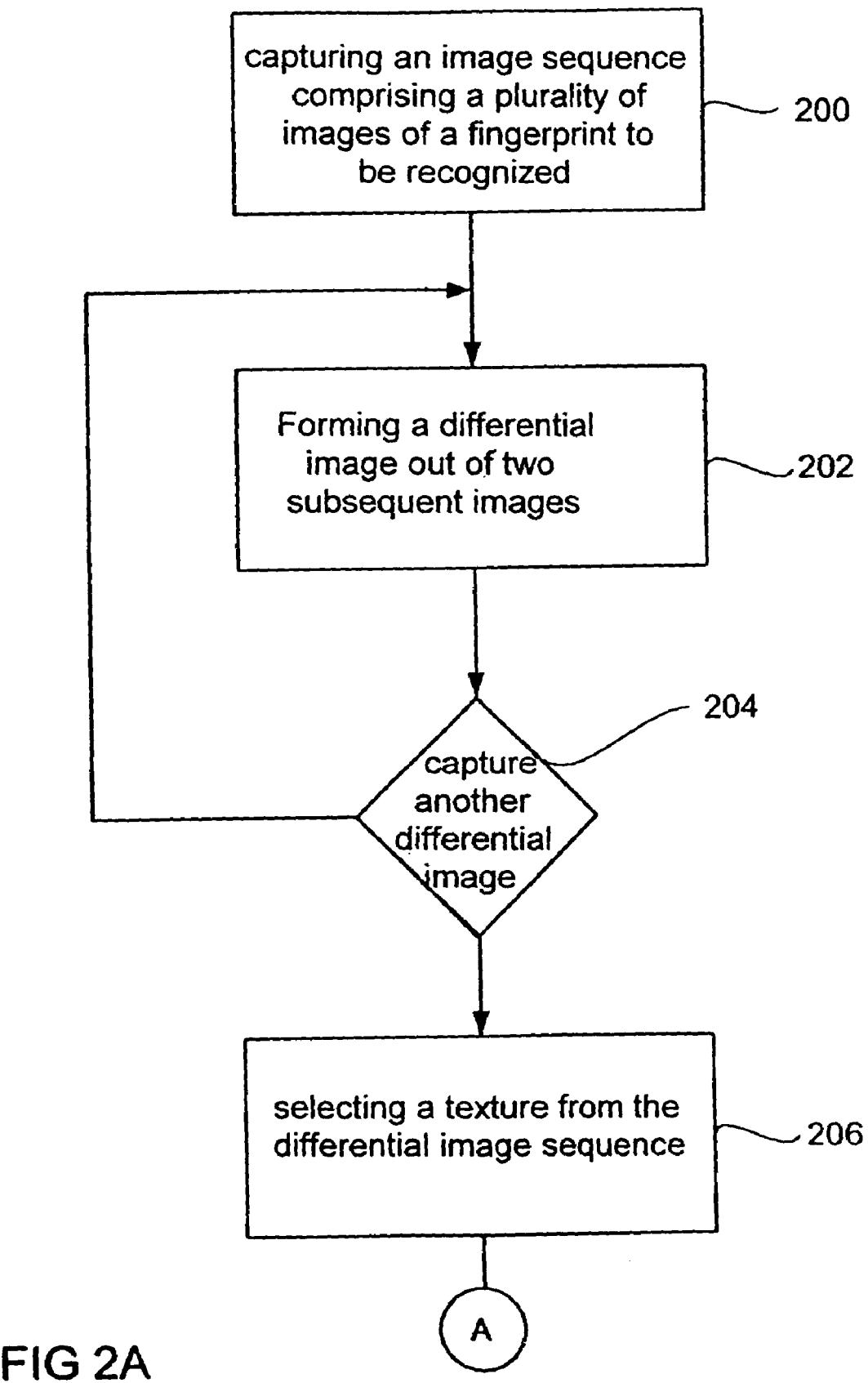
FIGS. 2A and 2B is a flowchart representing a preferred embodiment of the inventive method.
Figure 2B:
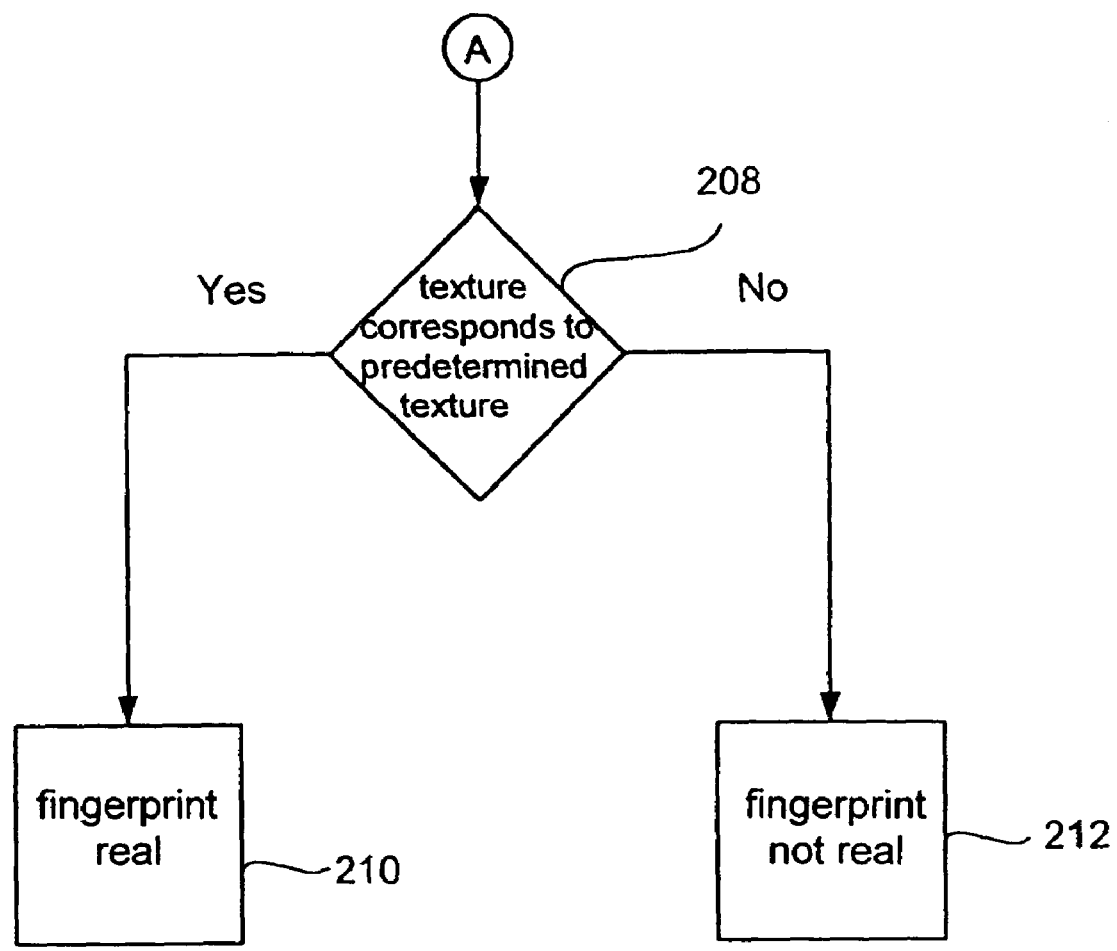

In FIG. 2A step 200 is shown, where for example the image sequence 100, shown in FIG. 1A, consisting of the images 0 to 19 representing the fingerprint to be recognised is captured. In the subsequent step 202 a differential image of two consecutive images is generated, for example by subtraction of two consecutive gray scale images of the image sequence pixel by pixel. In step 204 it is determined whether further differential images are to be captured or not. If step 204 determines that further differential images are to be captured, the method returns to step 202, otherwise the method proceeds to step 206. In step 206 a texture is chosen from the differential image sequence that will subsequently be compared with a predetermined texture in step 208 as shown in FIG. 2B. If the textures match, the method proceeds to step 210 where it is determined that the fingerprint is real, which means that the image sequence comes from a real finger. If it is determined in step 208 that the textures are not identical it will be determined in step 212 that the fingerprint is not real and that the image sequence therefore comes from a forgery.

Figure 3:
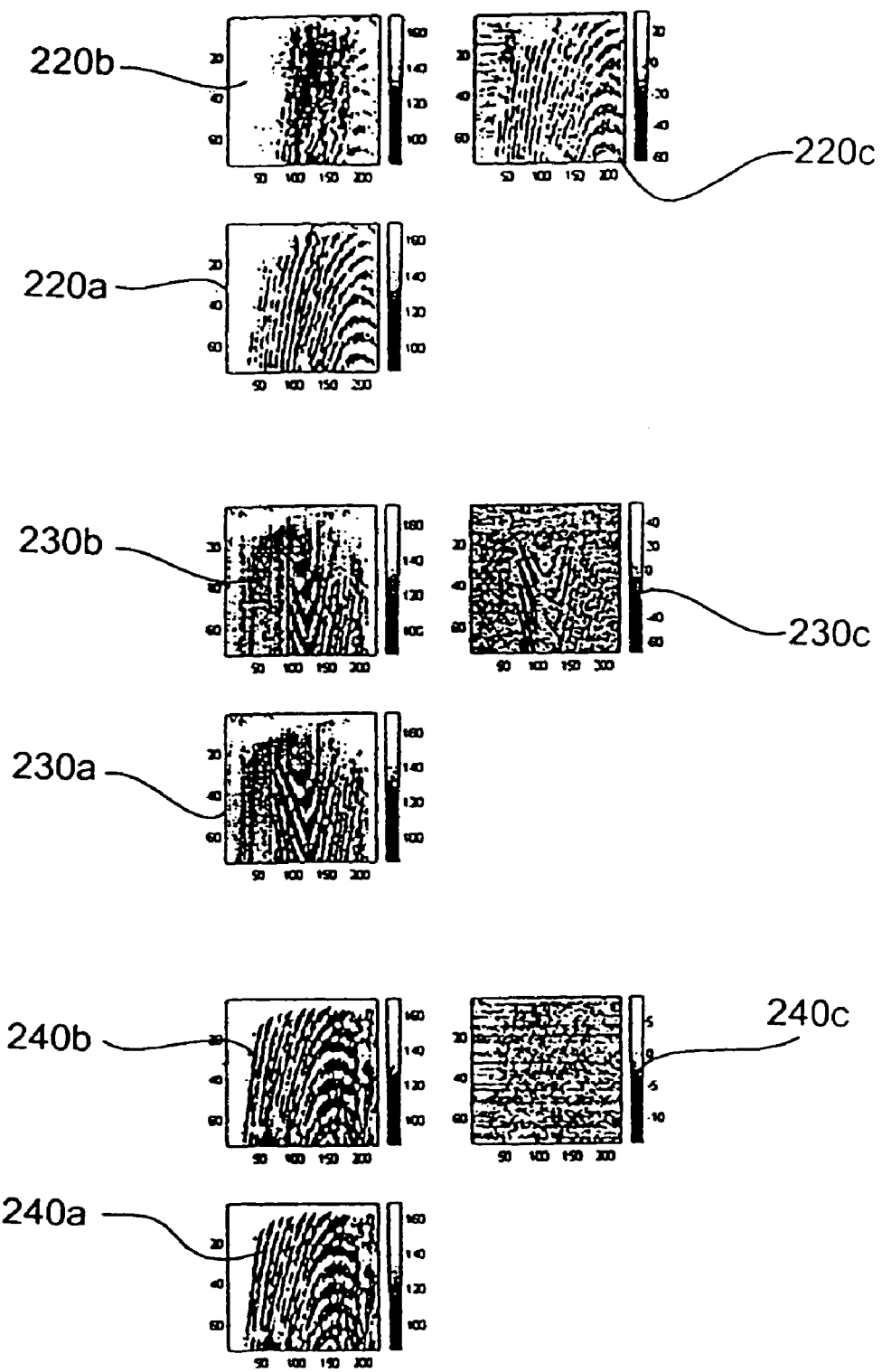
FIG. 3 are different representations of consecutive images and respective differential images for an original finger, a foil forgery and a breath forgery.

The above-described generation of differential images in the second step 202 will subsequently be discussed in more detail referring to FIG. 3. In FIG. 3 a current image 220a of an image sequence is shown that comes from an original finger. A previous image of the sequence is designated with 220b. A pixel-by-pixel subtraction of the images 220a and 220b results in the differential image 220c.

In FIG. 3 an image 230a is shown, which is a current image of an image sequence coming from a foil forgery. 230b designates the previous image in the sequence and 230c designates the differential image.

In 240a a current image of a image sequence is shown, which comes from a breath forgery. The previous image 140b is shown, the differential image is designated with 240c.

In FIG. 3 images 220a, 220b, 230a, 230b, 240a, 240b, respectively, are shown that have the full resolution (224 pixel) horizontally. Vertically there is only ¼ of the possible resolution (72 of 288 pixel). Only ¼ of the sensor image is read out to therefore make fast changes of the images sequence over time visible (a full image of the sensor can be read out in about 1/10 of a second, a quarter image 4 times faster, respectively). Only the margin area of the fingerprint images is therefore visible. For representation reasons, the images are stretched in the vertical direction so that the finger lines appear distorted.

The differential images 220c, 230c, 240c each show the characteristic growth of a fingerprint during the placing process.

In the original finger 220 it can be seen that, at first, the area where the finger lines can be found increases towards the outside in circles in broad approximation (the contact area of the finger increases). Furthermore it can be seen that the individual finger lines become broader (they get a dark margin in the differential image.)

In the foil forgery 230c the finger print area increases mostly in a straight line, which corresponds to the unrolling of the foil on the sensor. Above that, no growth of the finger line (ridges) can be recognized (no margins at the ridges).

In the breath forgery 240c no growth of the finger print area and also no growth of individual ridges can be recognised (the differential image 240c is only very weak and regular).

The differential images 220c, 230c and 240c therefore differ significantly so that due to them a distinction can be carried out between an image sequence coming from an original finger and an image sequence coming from a forgery.

Figure 4:
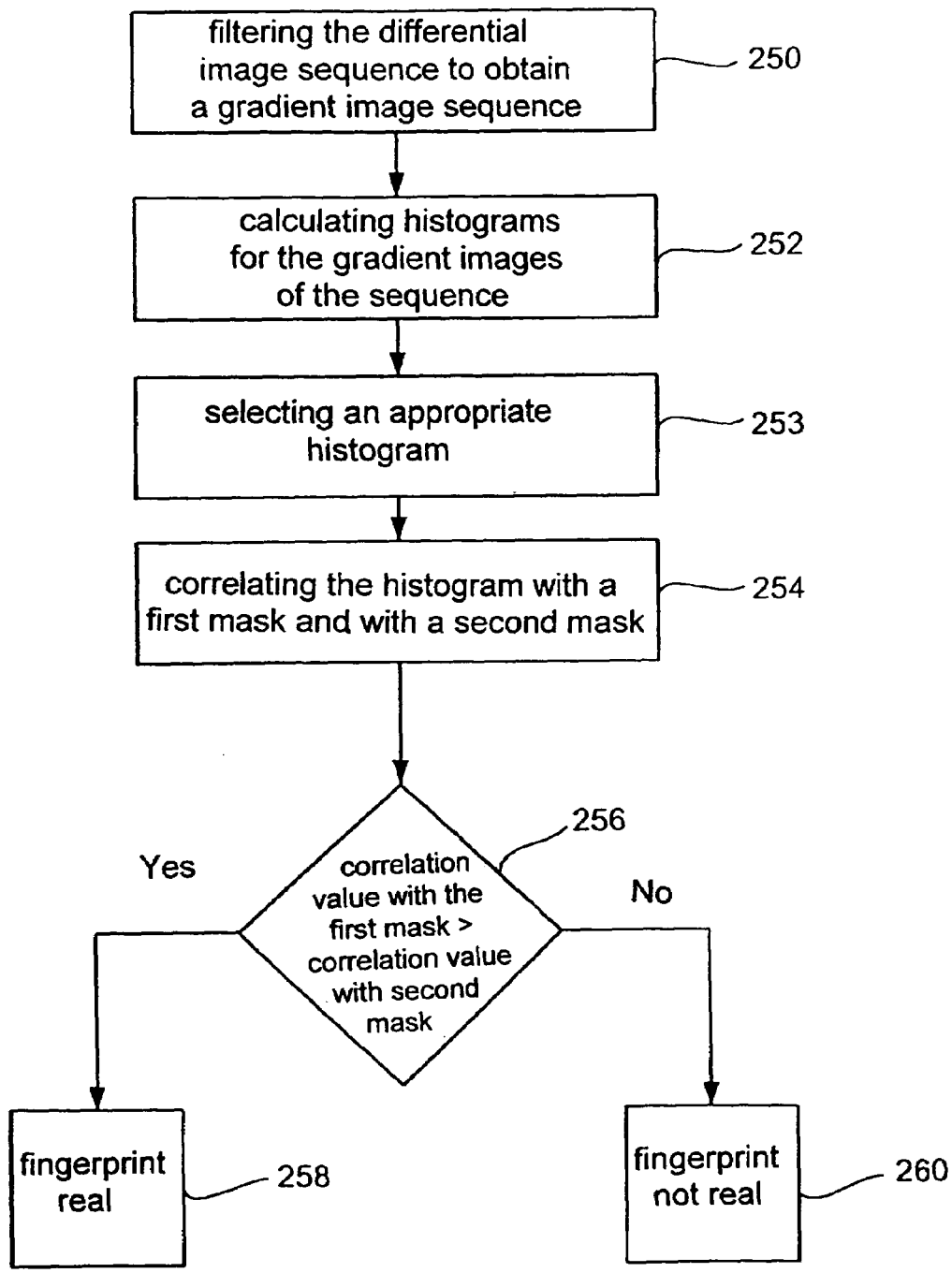
FIG. 4 is a flowchart explaining an embodiment of a texture classification according to the present invention in more detail.

According to FIG. 4 an example for texture classification of the generated gray scale differential images will be described in more detail below.

First, the generated gray scale differential image sequence is filtered in step 250 in order to obtain a gradient image sequence. According to a preferred embodiment a sobel filter accomplishes the filtering.

In the subsequent step 252 histograms will be calculated for the individual gradient images for the generated gradient image sequence. In step 253 an appropriate histogram is selected. Then, in step 254 a correlation of the selected histogram is accomplished with predetermined masks or templates, wherein a first template or a first mask is intended for an original finger and a second template or a second mask for a forgery. In step 256 it is determined whether a value for a correlation with an original finger template is higher than the value for the correlation with a forgery template. Preferably this classification is accomplished referring to images and respective differential images that have been captured at the time of placing the finger. If it is determined in step 256, that the value for the first template is higher than the value for the second template, step 256 follows where the fingerprint is classified as real, similar to step 210. Otherwise, the fingerprint is classified as not real in step 260, similar to step 212.

According to a preferred embodiment the steps 254 and 256 which means the correlation and the subsequent classification, are only carried out at the time of placing the finger, i. e. only for the few images in the sequence where the consecutive images are differing significantly in their area, which means, e. g., only for images 6 to 10 in the image sequence 100 shown in FIG. 1A. According to another preferred embodiment those images are determined by a calculation of the center of gravity in the histogram. Only when the center exceeds a predetermined threshold the histograms are led to the correlation and classification. In other words, at first a complete processing of all images is carried out, such that for consecutive images individual differential images are generated, and only according the histograms the actual selection of those differential images that will be used for correlation and classification is carried out.

Depending on the result of the inventive method further steps are introduced or not, e.g. the access to protected data, the opening of doors and others. If it is, e.g., determined that a fingerprint comes from a forgery an alarm or something similar is triggered of to indicate, e.g., the factory security officers, the attempt of an unauthorised intrusion.

When it is determined that the fingerprint is "real", the captured image sequence can alternatively be supplied to further processing for personal identification.

What is claimed is:

1. A method for forgery recognition, comprising:
   (a) capturing an image sequence comprising a plurality of images of a fingerprint to be recognized;
   (b) forming of at least one differential image from two images of the captured image sequence;
   (c) capturing a texture in the at least one differential image;
   (d) comparing the texture with a predetermined texture to determine whether the captured image sequence comes from a real finger or from an imitation.

2. The method according to claim 1, wherein the image sequence is generated during placing of a finger on a sensor unit and comprises images that are consecutive in time.

3. The method according to claim 1, wherein the images of the captured image sequence are captured as gray scale images.

4. The method according to claim 1, wherein a plurality of differential images is generated in step (b) by subtracting two consecutive images of the image sequence, respectively, images to be subtracted are those images that are arranged in the captured image sequence at the time of the first contact between finger and sensor unit.

5. The method according to claim 1, wherein in step (d) the texture captured in step (c) is compared with a first texture for a real finger and with a second texture for an imitation in order to classify the captured texture.

6. The method according to claim 1, wherein the step (d) further comprises:
   (d1) filtering a gray scale differential image to obtain a gradient image,
   (d2) calculating a histogram of the gradient image;
   (d3) correlating the calculated histogram with a first given mask for a real finger and with a second given mask for an imitation, and
   (d4) classifying the captured image sequence as coming from a real finger if the value of the correlation with the first mask is higher than the value of the correlation with the second mask.

7. The method according to claim 6, wherein the steps (d1) and (d2) are carried out for a plurality of differential images wherein the method comprises the following steps before the steps (d3) and (d4):
   calculating a center of gravity in each histogram,
   comparing the center of gravity with a threshold, and
   passing on those histograms, whose center of gravity exceeds the threshold, to the steps (d3) and (d4).

* * * * *